United States Patent
Schwartz et al.

(10) Patent No.: US 10,201,755 B2
(45) Date of Patent: Feb. 12, 2019

(54) SYSTEM AND METHOD FOR PROVIDING A PLATFORM FOR REAL TIME INTERACTIVE GAME PARTICIPATION

(71) Applicants: Marc Schwartz, Tokyo (JP); Gilbert Lamphere, New York, NY (US)

(72) Inventors: Marc Schwartz, Tokyo (JP); Gilbert Lamphere, New York, NY (US)

(73) Assignee: Pick A Play Networks Inc., New York, NY (US)

( * ) Notice: Subject to any disclaimer, the term of this patent is extended or adjusted under 35 U.S.C. 154(b) by 0 days.

(21) Appl. No.: 15/435,914

(22) Filed: Feb. 17, 2017

(65) Prior Publication Data
US 2017/0246539 A1    Aug. 31, 2017

Related U.S. Application Data

(60) Provisional application No. 62/299,973, filed on Feb. 25, 2016.

(51) Int. Cl.
| | |
|---|---|
| A63F 13/46 | (2014.01) |
| A63F 13/335 | (2014.01) |
| A63F 13/812 | (2014.01) |
| A63F 13/65 | (2014.01) |
| A63F 13/358 | (2014.01) |
| A63F 13/352 | (2014.01) |

(52) U.S. Cl.
CPC ............ *A63F 13/46* (2014.09); *A63F 13/335* (2014.09); *A63F 13/352* (2014.09); *A63F 13/358* (2014.09); *A63F 13/65* (2014.09); *A63F 13/812* (2014.09)

(58) Field of Classification Search
None
See application file for complete search history.

(56) References Cited

U.S. PATENT DOCUMENTS

| | | | |
|---|---|---|---|
| 2014/0196025 A1* | 7/2014 | Corinella | H04W 4/001 717/178 |
| 2016/0219024 A1* | 7/2016 | Verzun | H04L 63/102 |
| 2017/0266560 A1* | 9/2017 | Harris | A63F 13/45 |

* cited by examiner

*Primary Examiner* — Ronald Laneau
(74) *Attorney, Agent, or Firm* — Neal Marcus

(57) ABSTRACT

A method is disclosed of providing real time interactive participation during a game by a plurality of users through a plurality of game clients, respectively, wherein progress of the game is defined by a plurality of plays, the method is implemented by a system in which one or more nodes on a network are configured to communicate with a plurality of game clients and a central system, each node including one or more servers, the one or more servers are programmed to execute the method, the method comprising: requesting, by a game client, to communicate with the central system via a node in a cluster; searching for a node in the cluster with available bandwidth to communicate with the game client; initiating a direct connection between the client and the node with available bandwidth for communication; assigning the node the game client to enable direct communication relating to the game between the game client and the node; receiving, via the game client, a selection from the user of a play in the game, the selected play having a risk and/or reward; and receiving, an actual play based on the actual outcome in the game.

19 Claims, 6 Drawing Sheets

SYSTEM AND METHOD FOR PROVIDING A PLATFORM FOR REAL TIME INTERACTIVE GAME PARTICIPATION

CROSS-REFERENCE TO RELATED APPLICATIONS

The application claims priority to U.S. provisional application number 62/299,973, filed Feb. 25, 2016 entitled "System and Method For Providing a Platform For Real Time Interactive Game Participation" which is incorporated by reference herein.

FIELD OF THE INVENTION

The present invention relates to a system and method for providing a platform for real time interactive game participation.

BACKGROUND OF THE INVENTION

The online gaming industry has grown significantly over the years due to advancements in technology (e.g., graphics, sounds cards etc.), network (e.g., Internet) connection speeds and cloud service offerings. Online games are ubiquitous on modern gaming platforms including PCs (including Macs), consoles and mobiles devices. Social games and mobile games are especially popular among users. Due to growth of broadband Internet access and mobile network availability, the industry has developed games to enable numbers of users (players) from all over the globe to play against each other using their mobile devices and/or PCs (via applications or browsers). Popular mobile games with online communities include Clash of Clans, Li Chess, and Ingress (to name a few). While these games have a fairly large user following, they do not provide real time content delivery, user interaction and competition in connection with games such as live entertainment events.

SUMMARY OF THE INVENTION

System and method is disclosed for providing a platform for real time interactive game participation.

In accordance with an embodiment of the present disclosure, a method is disclosed of providing real time interactive participation during a game by a plurality of users through a plurality of game clients, respectively, wherein progress of the game is defined by a plurality of plays, the method is implemented by a system in which one or more nodes on a network are configured to communicate with a plurality of game clients and a central system, each node including one or more servers, the one or more servers are programmed to execute the method, the method comprising: requesting, by a game client, to communicate with the central system via a node in a cluster; searching for a node in the cluster with available bandwidth to communicate with the game client; initiating a direct connection between the client and the node with available bandwidth for communication; assigning the node the game client to enable direct communication relating to the game between the game client and the node; receiving, via the game client, a selection from the user of a play in the game, the selected play having a risk and/or reward; and receiving, an actual play based on the actual outcome in the game.

In accordance with another embodiment of the present disclosure, a system is disclosed of providing real time interactive participation during a game by a plurality of users through a plurality of game clients, respectively, wherein progress of the game is defined by a plurality of plays, the system comprising one or more nodes connected via a network configured to communicate with a plurality of game clients and a data store for storing a game database wherein data relating to the game is stored, the system programmed to execute the computer program modules, the modules comprising: a control room module that enables an operator to view a game and enter data relating to states of the game in real time; a game updater module that communicates with the control room module and the game database, the game updater validates input data received from the control room module; pick a play module that generates a plurality of options of plays for users selection before an actual play transpires in a game and enables the users to select an option of the plurality of options, each option represents a prediction of the next outcome for the actual play with a risk and reward; and a score keeper module that communicates with the game database and configured to register changes in score with the game database.

In accordance with another embodiment of the disclosure, a system is disclosed for providing a platform for real time interactive game participation by a user through a game client, the system comprising a data store for storing a game database wherein data relating to a game is stored and a plurality of nodes on a network coupled to the data store for communicating with game database, the plurality of nodes including a load balancer, the system configured to execute method steps, the method steps comprising: requesting, via the load balancer, to uncover a first node of the plurality of nodes with available bandwidth for communicating with the game client; establishing communication between the first node with the game client via the first node once the first node is uncovered; and transmitting user game play selections, actual play outcomes and/or game state data between the game client to the first node via the network.

DETAILED DESCRIPTION OF THE INVENTION

Figure 1:
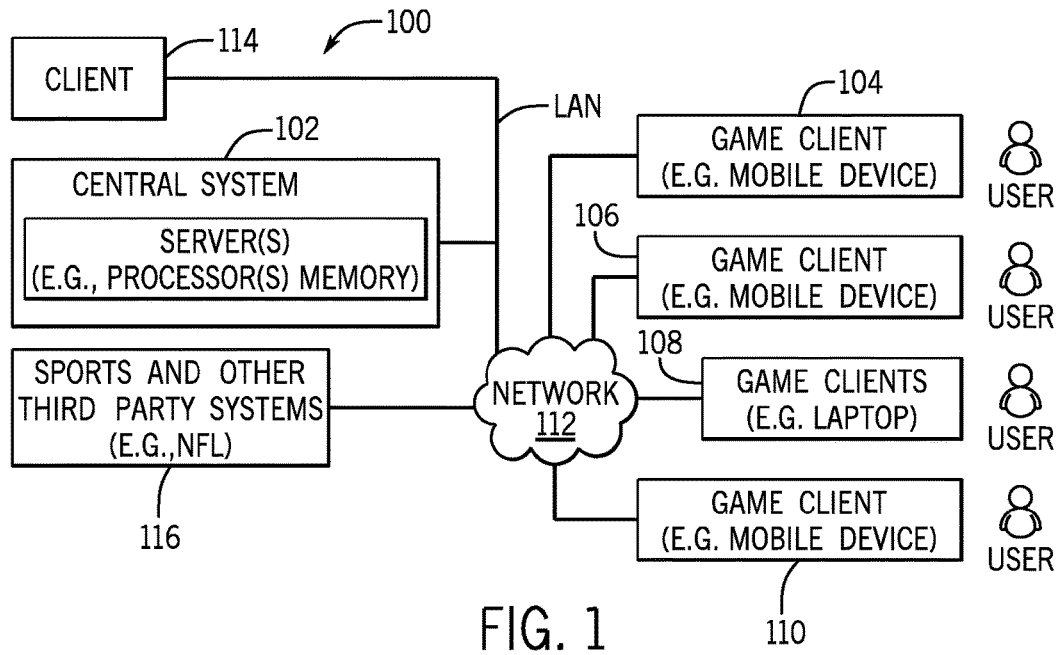
FIG. 1 depicts a block diagram of an example system in which a platform for real time interactive game participation operates.

FIG. 1 depicts a block of an example system 100 in which a platform for real time interactive game participation operates. This platform (200 as discussed in more detail below) is used to create gaming experiences for any type of game (i.e., event) including adding entertainment value to live sporting events such as football or baseball contests on television. The platform allows viewers of a game, i.e., users of the platform, to analyze the game, predict outcomes, and compete against other viewers across the globe. The platform delivers real-time content synchronized with the happenings of a live event on TV (or alternatively a recorded event), responding to viewer interaction, and potentially scaling to millions of viewers worldwide. This is described in more detail below.

System 100 includes a central system 102 and several game clients 104, 106, 108, 110 that access program modules and data (as described below) from central system 100 via network 112. Clients 104, 106, 108, 110 may communicate with central system 102 over network 112 wirelessly (e.g., wireless carrier networks, WIFI) or alternatively a wired connection (e.g., cable, ISDN) as described in more detail below. Network 112 may be the Internet, Local area network (LAN), the combination of Internet and LAN or any other network known to those skilled in the art. System 100 also includes client 114 that communicates with central system 102 over a local area network (LAN) via wireless or wired connection as known to those skilled in the art. System 100 further includes sports and other third party systems (e.g., football and baseball) 116 in which sports and other game data (e.g., game statistics) are used by central system 102 (i.e., the platform described herein). This data may be transmitted via Satellite or other communication means. However, client 114 may be connected directly to central system 102 as known to those skilled in the art. An operator or administrator typically uses client 114 for (a control room, described below, on) the platform (200 below) described herein.

Central system 102 comprises one or more servers that are typically connected via a local area network (LAN). The one or more servers may include a web server. These servers may be located at various locations across network 112. Each server includes several internal components (e.g., processor, memory, drives, etc.), databases, software modules and applications (e.g., browser) as known to those skilled in the art.

Clients 104, 106, 108, 110, 114 may be mobile devices or personal computers. A mobile device may be a smartphones, cellular telephones, tablets, PDAs, or other devices equipped with industry standard (e.g., HTML, HTTP etc.) browsers or any other application having wireless (e.g., cellular, Bluetooth, IEEE 802.11b etc.) or wired access (e.g., Ethernet) via networking (e.g., TCP/IP) to nearby and/or remote computers, peripherals, and appliances, etc. TCP/IP (transfer control protocol/Internet protocol) is the most common means of communication today between clients or between clients and systems (servers), each client having an internal TCP/IP/hardware protocol stack, where the "hardware" portion of the protocol stack could be Ethernet, Token Ring, Bluetooth, IEEE 802.11b, or whatever software protocol is needed to facilitate the transfer of IP packets over a local area network. The mobile devices typically include a processor, memory, operating system such as iOS or Android, video electronics, display and other components as known to those skilled in the art.

Personal computer may be a laptop or desktop that includes conventional components including a processor, memory (Random Access Memory (RAM) and Read Only Memory (ROM)), hard drive, graphics card and network card for interfacing with the network as known to those skilled in the art. The personal computers each will also include operating system (OS software) and other software applications such as a web browser. The OS may be Microsoft Windows, but other operating systems may be used. The personal computer may be connect to central system 102 wirelessly (e.g., WIFI) or wired connection as discussed above. The personal computer also typically includes a display, keyboard and mouse (pointing device) as known to those skilled in the art.

Sports system or other third party system 116 (e.g., football or baseball) includes a cluster of one or more servers that comprise sporting applications and data relating to sport teams, players, game statistics etc. for sports fans to access as known by those skilled in the art. The National Football League (NFL) and Major League Baseball (MLB) are examples of sports organizations that generate and provide applications and data, which are used by central system 102 to derive data for the platform (200 below) users. These systems typically have several servers connected across a local area network (LAN) and/or the Internet as known to those skilled in the art.

Figure 2:
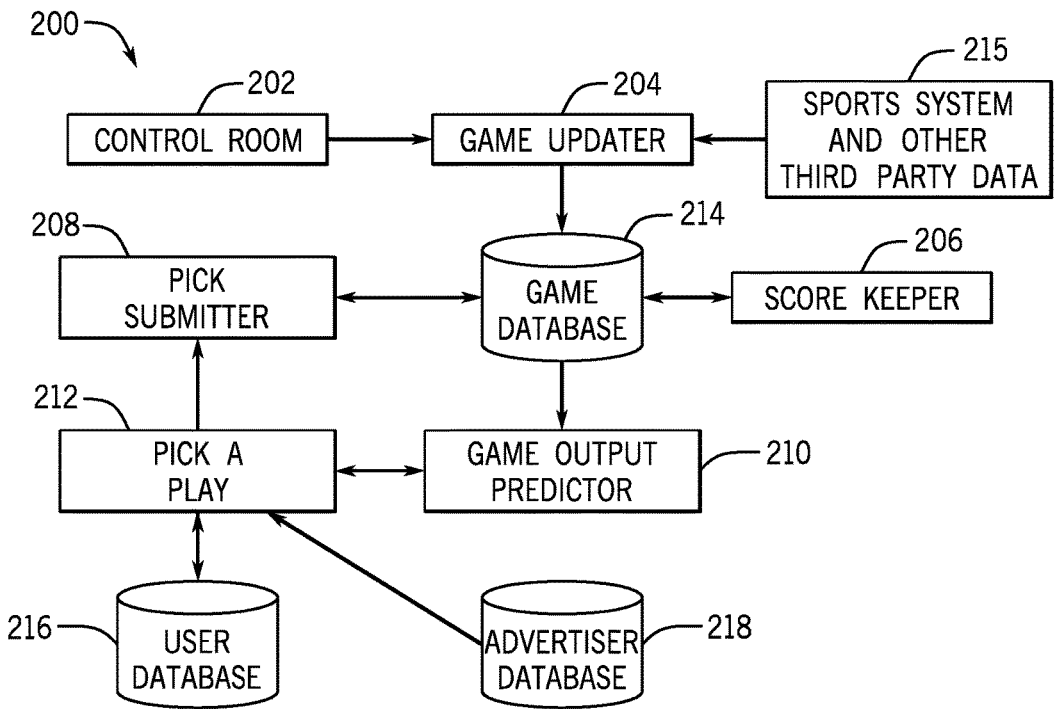
FIG. 2 depicts a block diagram of the modules/applications and databases associated with the platform for real time interactive game participation.

FIG. 2 depicts a block diagram of the software modules/applications and databases associated with platform 200 of FIG. 1. In particular, platform 200 comprises modules/applications such as control room 202, game updater 204, pick submitter 206, score keeper 208, game output predictor 210, pick a play 212 and databases such as game database 214, sports system and other third party data 215, user database 216 and advertiser database 218. Control room 202, game updater 204, pick submitter 206, score keeper 208 and game predictor 210 are configured as part of central system 102 and pick a play is an application/module installed and implemented on each of clients 104, 106, 108 and 110 to access the modules and databases on central system 102. However, those skilled in the art know that some or all modules/applications/databases may be part of another system and/or clients. Sport system and third party data 215 may be streamed live or alternatively stored as part of a database.

Figure 7:
FIG. 7 depicts a screen shot of an example display of the control room of the platform for real time interactive game participation.

Control room 202 is a module/application on central system 102 and available to human operators or administrators of platform 200. Control room 202 enables operators to watch a live football game (contest) and quickly and accurately enter/input facts/data about the game in real time. For example, the operator will enter each possession, outcome, play outcome, penalty, score, timeout etc. Specifically, an operator may enter a first down, kick off, and periods for play selection (i.e., "open" and "closed" times whereby play options are available and no longer available for the user to play, respectively). Computational human (user) assistance is available throughout a contest/game. For other sports, the operator enters other data relating to that sport. Play option selections are available for users similar to football or any other sport. An example view of a control room is shown in FIG. 7. In some embodiments, the operator may be any user across the network 112 (whether individual or third party.)

Game updater 204 is a module/application that communicates between control room 202 and game database 214. Game updater 204 receives and validates input data from control room 202. Specifically, game updater 204 will validate operator credentials and data entries from one, two or more operators (from one or more control rooms 202), if more than one operator is used. In addition, game updater 214 may receive data 215 from the sport and third party systems 116. Game updater 204 is configured to have write privileges only (to databases 214 and data 215), but those skilled in the art know that game updater 204 may have been assigned other privileges for platform 200.

Pick a play 212 is an application/module that may be downloaded and installed on each game client 104, 106, 108, 110 that enables users (players) to use platform 200 and play a game. In short, the pick a play module 212 will present the user with the current details for the next event in the game, i.e., the next play along with several selections for the play before each actual televised sports play. Each selection will be an option to select or predict the next outcome for that play with different risk and rewards.

Figure 8C:
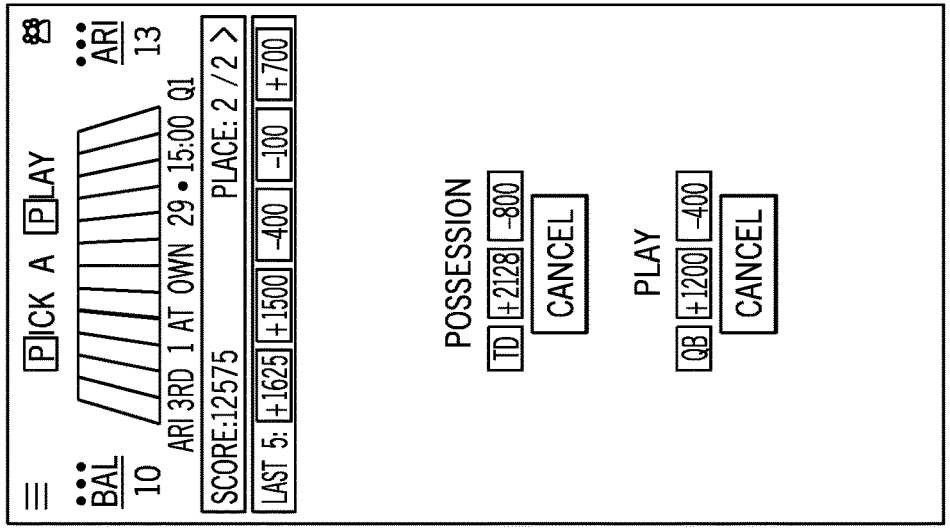
FIG. 8A-C depicts three screen shots of the pick a play application on game clients as shown in FIG. 7.
Figure 8B:
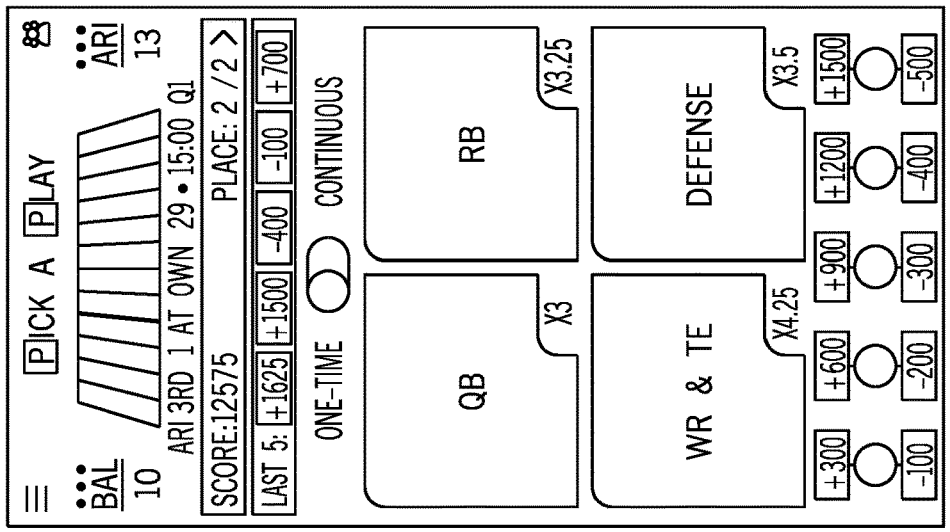
Figure 8A:
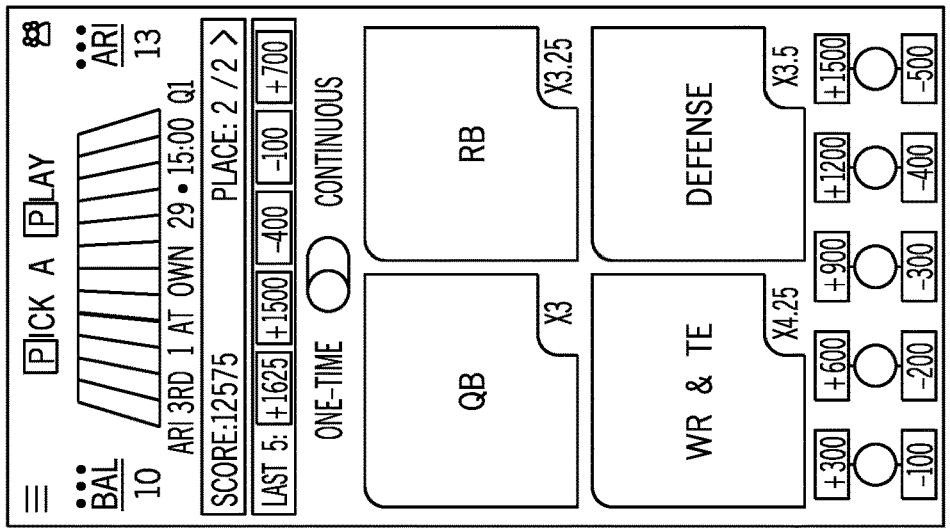

In one embodiment, application/module 212 will present a user with player position options such as a quarterback, running back, tight end/wide receiver and defensive selections. If a user selects the quarterback option, a user believes a pass is expected. In another embodiment, application/module 212 will present a user with specific player actions to select such a run, blitz, pass etc. In either embodiment, a user will be presented with a current set of facts about the current game state (e.g., game stats such as 30 yard line, time in game, 4th down and 2 yards to go for a 1st down etc.). In addition, a user will be presented with probable sports outcomes (e.g. 30% of time a specified action is taken with the current stats) that are calculated by the game output predictor 210 as described below. A user will be provided with a certain amount of points and the user can predict the outcome of possessions and plays (making picks) to win points and potentially, prizes. Three representations of screen shots of the pick a play module/application on game clients are shown in FIGS. 8A-8C.

Score keeper 206 is a module/application that communicates with game database 212 only as shown in FIG. 2 but those skilled in the art know that score keeper may be configured for communication differently. Score keeper 206 is configured to register changes with database 214. That is, score keeper 208 functions to publish and subscribe to database 214 any and all new scores and other updates. When a user submitted picks and the corresponding play or possession outcomes are both present, score keeper 206 will evaluate each and all picks and plays in a game (after each play) and assign a score for each user (player). Those pick scores are then added to previous pick scores and the sum for each player is collected and transmitted in real time to a user's pick a play application (game client) wherein a leaderboard publishes the scores of users (players).

Pick submitter 208 is a module/application wherein user picks are received for the next play (e.g., a possession in football), and both user and his/her picks are validated and then transmitted to game database 214 for subsequent use by score keeper 206. Validation involves pick authentication and time stamp embossing.

Game outcome predictor 210 is a module/application configured to calculate the probability outcomes for each option offered for user selection per play. These calculations may be made with an artificial neural network prediction or other algorithm as known to those skilled in the art. In such an example neural network, data is written to a data store through one or more input receptors, which replicates the input across all cluster nodes. The data is then processed in a series of hidden layers. The data store then transmits fully processed output to appropriate recipients that are connected to a specific node via a computer network. For example, game updater 204 may be configured as an input receptor as it receives input from control room module 202, from which a representation of the current state of the football game is updated and maintained in a hidden layer and eventually (within a few thousandths of a second) transmitted to recipients (game clients)). Pick submitter 208 is typically configured as an input receptor in the neural network. Score keeper 208 is a process that operates entirely in the hidden layer of a neural network. Neural networks such as feed forward back propagation and universal approximators are examples.

Game database 214 is a database, as known to those skilled in the art, for storing game data relating to game plays, player information, play prediction statistics, user picks, etc. Game updater 204 and pick submitter 208 transmit data to game database 214.

User database 216 is a database, as known to those skilled in the art, for storing data relating to registered users such as names, email addresses, preferences, game favorites and other useful user data.

Advertiser database 216 is a database, as known to those skilled in the art, for storing data relating to advertisers and advertisements that have registered to be provided to users during play on the pick a play application/module.

Note that the databases shown in FIG. 2 may be in a multi-master replication format, i.e., the database data may be distributed so that any number of users can access data relevant to their tasks without interfering with the works of others (minimal latency as described below). In addition, the data disclosed herein are stored in database structures but those skilled in the art know that other data structures exist as a storage mechanism.

Figure 3:
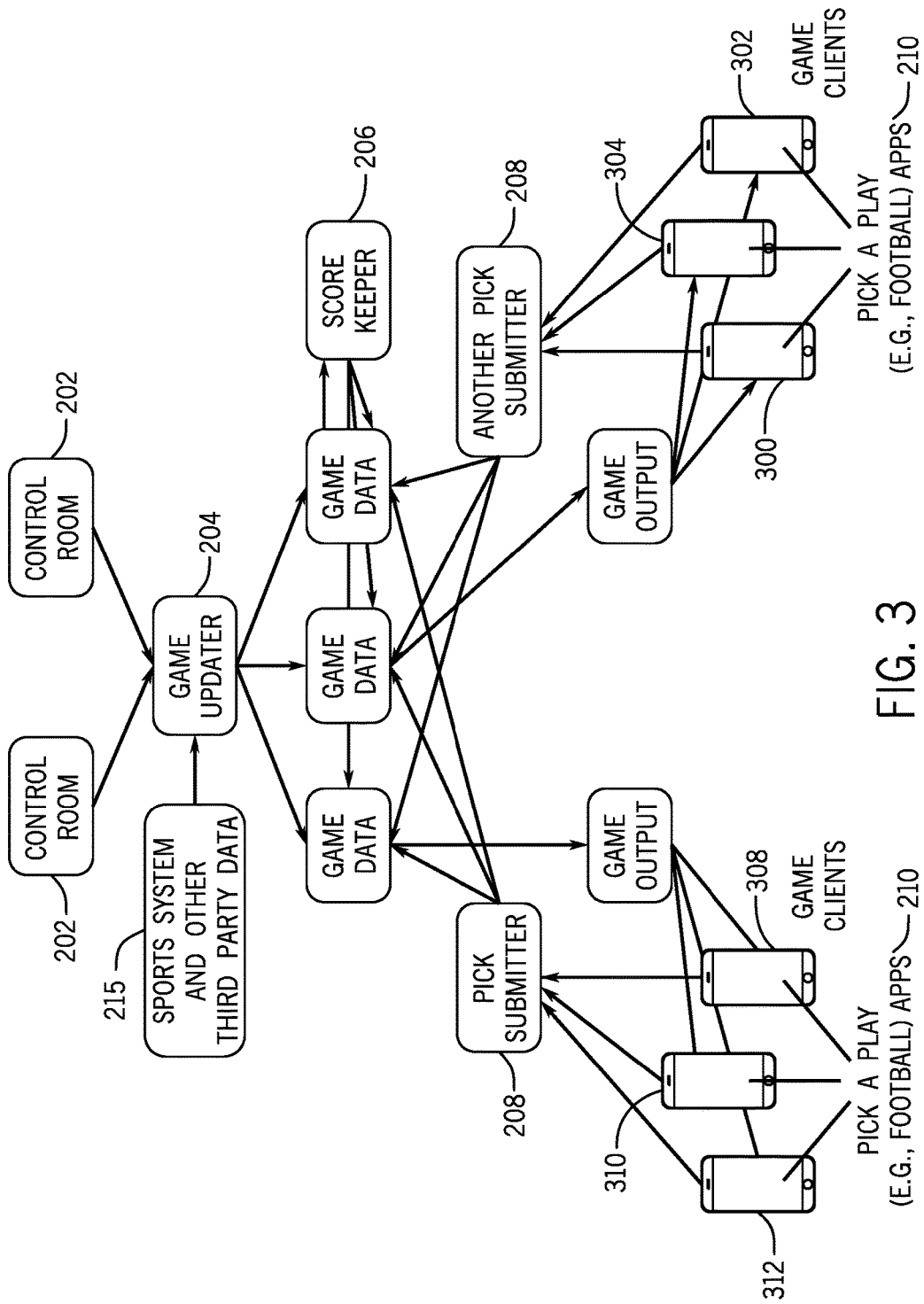
FIG. 3 depicts a high level diagram of the data flow among game clients and the modules of the platform for real time interactive game participation.

FIG. 3 depicts a high level diagram of the data flow between game clients 302-312 and the modules of platform 200 for real time interactive game participation. In particular, several game clients 302-312 (same functionality and components as game clients 104-108) are shown in communication with several platform 200 modules including pick submitters 208, scorekeeper 206, game updater 204 and control room modules 202. Game data flow is also shown with respect to these modules and game clients. Data 215 from sports and other third party systems 116 may also be employed.

Figure 4:
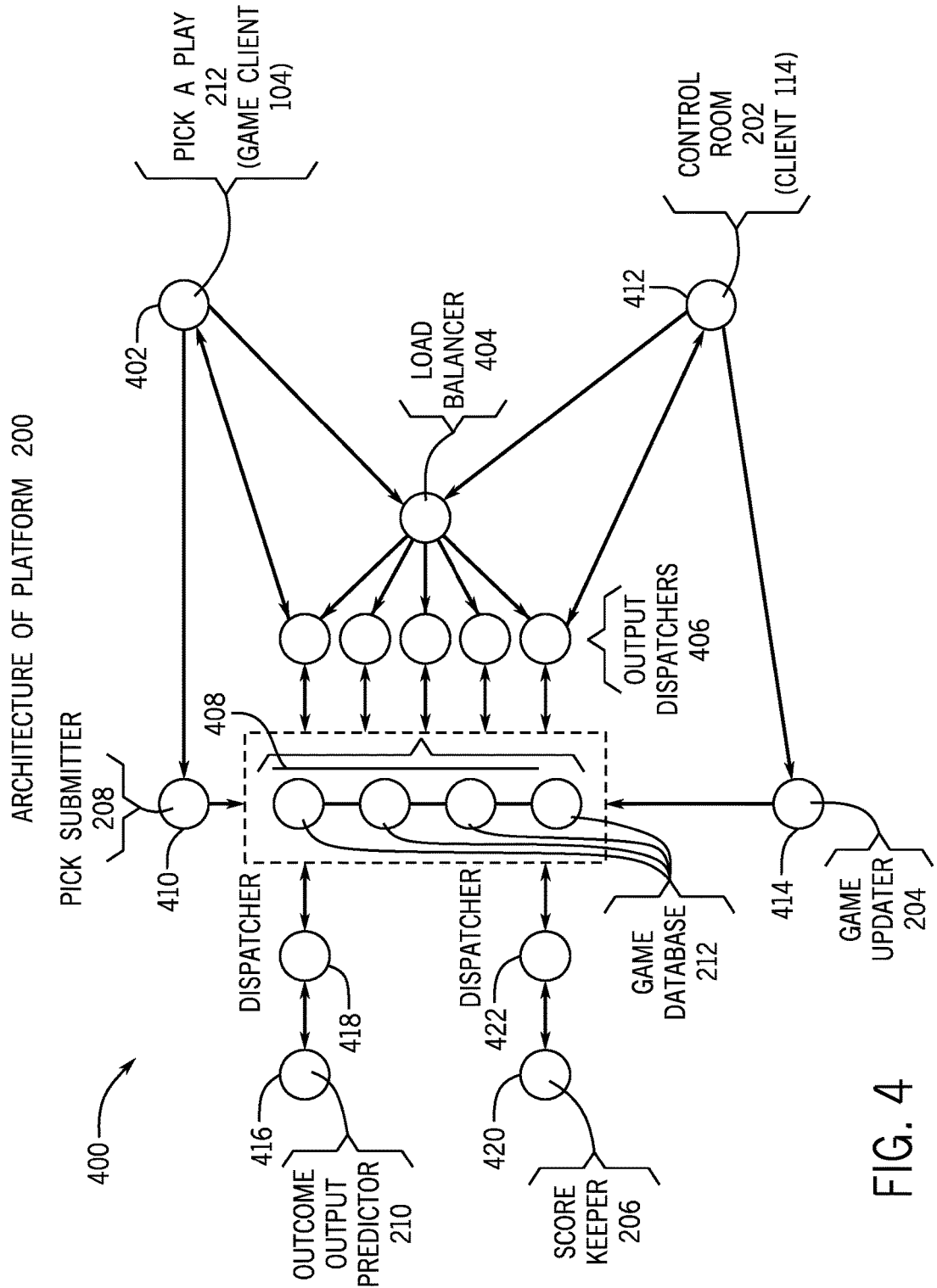
FIG. 4 of the architecture for the platform for real time interactive game participation.

FIG. 4 depicts the architecture 400 for platform 200 for real time interactive game participation. In brief, the modules and databases of platform 200 are generally organized in computer clusters as known to those skilled in the art. Each cluster may have any number of nodes based on computation, memory and bandwidth demands of system 100, and each node may have one or more servers for computing. Architecture 400 depicts the interaction between the modules and databases in FIG. 2 with respect to these nodes of the clusters. In particular, pick a play data are transmitted between pick a play module/application 210 (game client 104 and also represented as node 402) and game database 214 (stored across several nodes 408). In this respect, the pick a play data are transmitted through load balancer 404 and output dispatchers (nodes) 406 as known to those skilled in the art. The pick a play data from pick a play application/module 212 (on game client 104 and also represented by node 402) is also transmitted to game database 214 via pick submitter 208 (on node 410 where it is stored and executed). An operator (administrator) transmits data between control room 202 (client 114 also represented as node 412) and game database 214 (nodes 408) via load balancer 404 and output dispatchers 406 as well as via game updater 204 (node 414). Data is transmitted between game database 214 and score keeper module 206 (node 420) via a dispatcher 422. Prediction data is transmitted between data outcome predictor 210 (node 416) and game database 214 via dispatcher 418. Data is transmitted between score keeper 206 (node) and database 214 via dispatcher 422.

Figure 5:
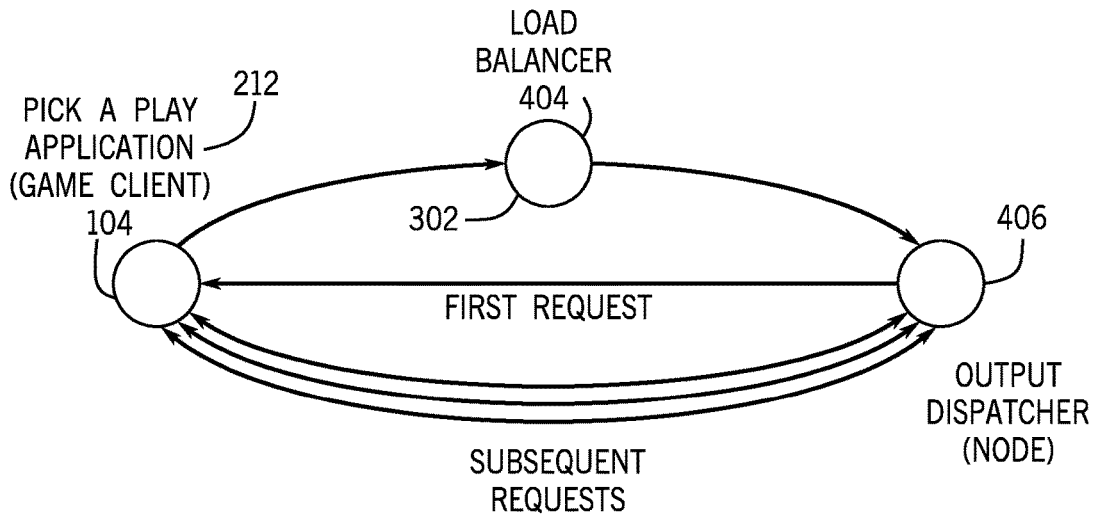
FIG. 5 depicts a diagram of an example network connections for communication between a game client and a network for deploying the platform for real time interactive game participation.

FIG. 5 depicts a diagram of example network connection for communication between game client 104 (for example) and a network for deploying platform 200 for real time interactive game participation. Specifically, the diagram depicts example network connections with respect to architecture 400 shown in FIG. 4. The network connection is an efficient low-latency network connection for near time communication that provides real time data to a user of pick a play module/application 212. This is described in more detail below.

Figure 6:
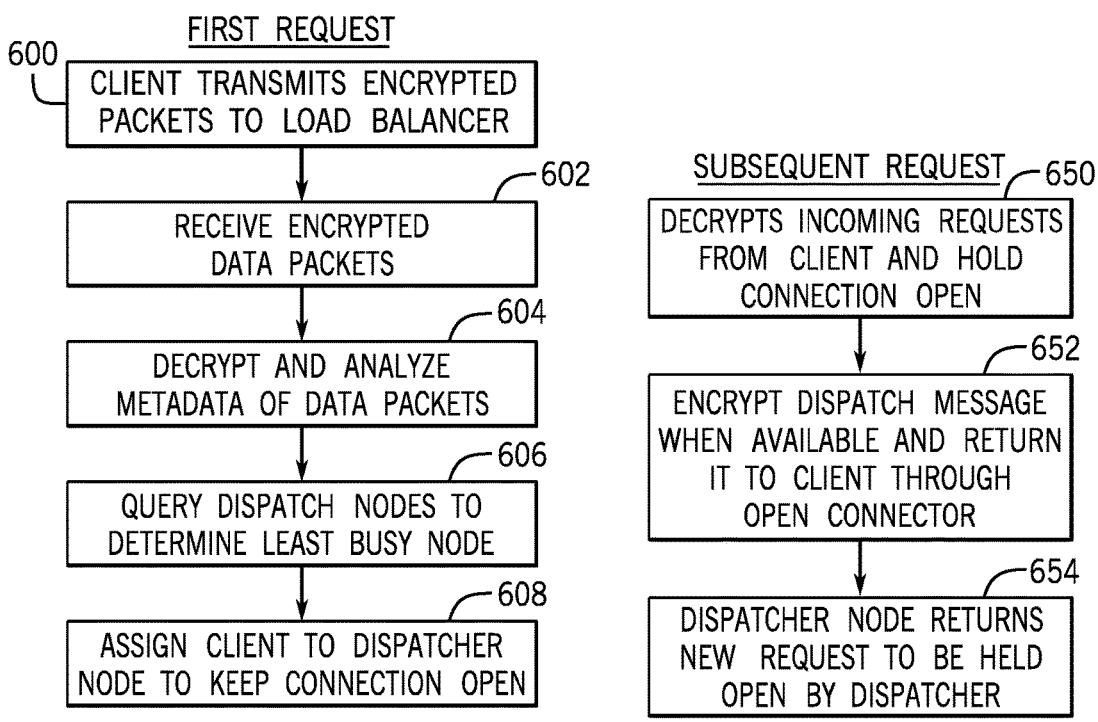
FIG. 6 depicts example application process steps of the example connection in FIG. 4.

FIG. 6 depicts example application process steps of the example connection in FIG. 5 for providing the efficient low-latency network connection. Steps 600-608 represent a game client's first request with an available node (i.e., with sufficient bandwidth) on a network for establishing communication with that node for using platform 200, and steps 610-614 represent game client's subsequent requests for communication with that node. In particular, execution begins at step 600 wherein a client sends encrypted packets (pick) to load balancer 402, and at step 602, load balancer 404 receives such data packets. Execution proceeds to step 604 wherein load balancer 404 decrypts and analyzes the packet meta-data. At step 606, load balancer 402 404 queries dispatcher nodes 406 to find an available node (the least busy node) for transmission. Execution proceeds to step 608 wherein load balancer 402 assigns game client 104 to a particular dispatcher node 406 and dispatcher node 406 maintains the open connection for subsequent direct communication.

Now, for subsequent communication requests, execution begins at step 650 wherein dispatcher node 406 decrypts an incoming request from client game 104 and holds the connection open between client 104 and node 406. Execution then proceeds to step 652 wherein, when a dispatch message is available, the message is immediately encrypted and returned to game client 104 through the open connection. Execution then proceeds to step 654 wherein game client 104 receives the dispatched message and immediately sends a new request to be held open by dispatcher 406.

In practice and as an example of the communication by client 104 with a network supporting platform 200, data moves through architecture 400 in the following steps: (1) a user opens pick a play application/module 212 via client 104; (2) client 104 makes a request to load balancer 404; (3) load balancer 404 finds (searches for) an appropriate node in a cluster (i.e., with available bandwidth including geographical proximity) to communicate with client 104; (4) the node initiates direct connection with client 104 and all game updates flow through this connection; (5) the user enters a game and submits a play and pick via pick a play application/module 212, brokered by pick submitter 208; (6) operator/administrator selects (i.e., review and interpretation of a play) an actual play outcome, brokered by game updater 204, and the play outcome is immediately sent through the connection established in step (4); (7) client 104 updates pick a play application/module 212 (screen) with the play outcome; (8) score keeper module 206 runs and tally's a leaderboard for a given game; (9) the leaderboard is immediately sent through connection established in step (4); and (10) client 104 updates the leaderboard on client 104 screen. This is the basic operation of data movement.

The embodiments described herein support one game played by multiple users as well as multiple games simultaneously broadcasted and played by multiple users.

It is to be understood that the disclosure teaches examples of the illustrative embodiments and that many variations of the invention can easily be devised by those skilled in the art after reading this disclosure and that the scope of the present invention is to be determined by the claims below.

What is claimed is:

1. A method of providing real time interactive participation during a game by a plurality of users through a plurality of game clients, respectively, wherein progress of the game is defined by a plurality of plays, the method is implemented by a system in which one or more nodes on a network are configured to communicate with a plurality of game clients and a central system, each node including one or more servers, the one or more servers are programmed to execute the method, the method comprising:

requesting, by a game client to a first node, to communicate with the central system via the first node in a cluster of nodes;

searching, by the first node, for a second node in the cluster of nodes with available bandwidth to communicate with the game client;

assigning the second node to the game client to enable direct communication relating to the game between the game client and the second node;

initiating, by the second node, a direct communication between the game client and the second node with available bandwidth for communication;

receiving, via the game client, a selection from the user of a play in the game, the selected play having a risk and/or reward; and receiving, via the central system, an actual play based on an actual outcome in the game.

2. The method of claim 1 wherein assigning a value to the user if the actual play matches the user selected play.

3. The method of claim 1 wherein the first node is a load balancer.

4. The method of claim 1 further comprising generating a plurality of options of a play in the game offered for selection by the user, each option of the plurality of options of a play is associated with a risk and/or reward.

5. The method of claim 3 further comprising:

calculating the probability outcomes for each option for a play offered to the user for selection.

6. The method of claim 4 wherein calculating includes using an artificial neural network algorithm.

7. The method of claim 1 further comprising discontinuing communication between the first node and the second node after communication has been initiated between the second node and the game client.

8. A system of providing real time interactive participation during a game by a plurality of users through a plurality of game clients, respectively, wherein progress of the game is defined by a plurality of plays, the system comprising one or more nodes connected via a network configured to communicate with a plurality of game clients and a data store for storing a game database wherein data relating to the game is stored, the system programmed to execute the computer program modules, the modules comprising:

a control room module that enables an operator to view a game and enter data relating to states of the game in real time;

a game updater module that communicates with the control room module and the game database, the game updater validates input data received from the control room module;

a pick a play module that generates a plurality of options of plays for users' selection before an actual play transpires in a game and enables the users to select an option of the plurality of options, each option represents a prediction of a next outcome for the actual play with a risk and reward; and a score keeper module that communicates with the game database and configured to register changes in score with the game database.

9. The system of claim 8 wherein the modules further comprise:

a pick submitter module that communicates with the game database and configured to receive and transmit user selections for a next play to game database for use by the score keeper.

10. The system of claim 9 wherein the modules further comprise a game outcome predictor module that communicates with the pick a play module and game database, the game outcome predictor module configured to calculate probability outcomes for each option offered for user selection per play.

11. The system of claim 10 wherein the game output predictor module is configured to calculate using an artificial neural network prediction algorithm.

12. The system of claim 10 further wherein the game output predictor module is further configured to store calculated probability outcome data.

13. The system of claim 12 wherein the data store is configured to replicate the calculated probability outcome data across one or more nodes within a cluster.

14. The system of claim 13 wherein the data store is configured to transmit the calculated probability outcome data to game clients of users that are connected to a node via the network.

15. The system of claim 8 wherein the game updater module is configured to receive data input from the control room module and update a current state of the game.

16. The system of claim 15 where the game updater is further configured to transmit to the current state of the game clients of the users.

17. A system for providing a platform for real time interactive game participation by a user through a game client, the system comprising (1) a data store for storing a game database wherein data relating to a game is stored and (2) a plurality of nodes on a network coupled to the data store for communicating with the game database, the plurality of nodes including a load balancer, the system configured to execute method steps, the method steps comprising:

requesting, by the game client to the load balancer, to uncover a node of the plurality of nodes on the network with available bandwidth for communicating with the game client;

establishing communication between the node and the game client once the node is uncovered;

discontinuing communication between the load balancer and the node after communication has been established between the node and the game client; and transmitting user game play selections, actual play outcomes and/or game state data between the game client and the node via the network.

18. The system of claim 17 wherein the method further comprise assigning, by the load balancer, a game client to the node after the node has been uncovered and maintaining an open connection for subsequent communication.

19. The system of claim 17 wherein the game is a sporting event.

* * * * *